United States Patent Office 3,297,453
Patented Jan. 10, 1967

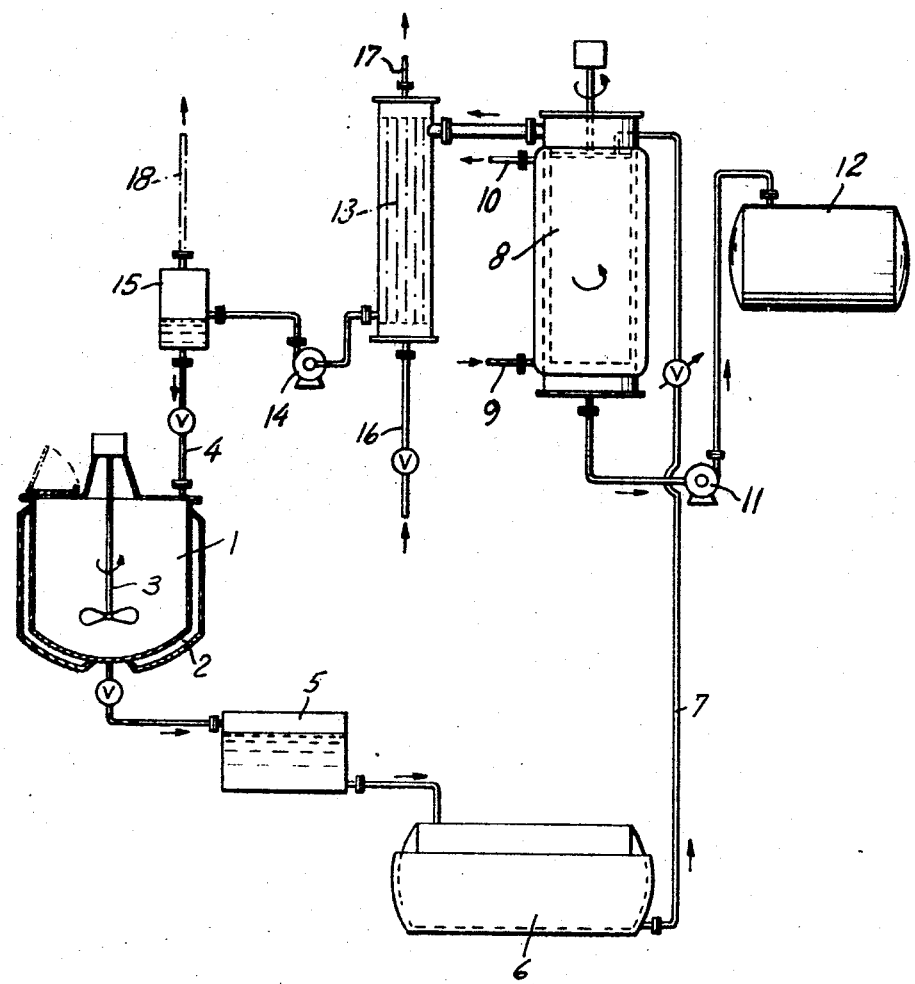

3,297,453
METHOD FOR THE TREATING OF HONEY AND THE LIKE
Berthold Kranz, Duren, Germany, assignor to Carl Canzler, Duren, Germany
Filed Mar. 31, 1964, Ser. No. 356,247
10 Claims. (Cl. 99—146)

The present invention relates to a method and apparatus for treating honey and the like and, more particularly the present invention is concerned with producing a molten honey which is clear and free of solid constituents without adding any extraneous substances to the honey to be treated.

Due to the high temperature sensitivity of honey, the conventional melting of the same frequently impairs the quality of the finished product. It has been suggested to avoid any impairment of the honey during melting of the same by carrying out the melting process at relatively low temperature for a relatively short period of time. However, it has been found that, particularly honey of relatively low water content, cannot be molten under such conditions so as to obtain a clear liquid product. Honey of low water content, when molten for a relatively short period of time and at a relatively low temperature, will remain cloudy. Particularly commercial honey of very low water content cannot be treated within the desired limitations of temperature and time so that the difficultly melting constituents of such honey are also completely molten and blended into a homogeneous product. Since it is desirable to clean the crude honey by removal of dirt particles and the like therefrom, it is necessary to form a flowable, in fact an easily flowable molten product which can then be purified by passing through a fine mesh sieve or screen. Furthermore, there is a great commercial demand for clear molten honey, which is more easily saleable than cloudy honey.

In addition, the methods proposed up to now to treat honey at relatively low temperatures will not fully eliminate the small air bubbles which generally can be found finely distributed in the honey which is to be treated. It is important to eliminate these air bubbles since the same give the honey a cloudy appearance. It has been proposed to subject the honey to vacuum treatment in order to remove the air bubbles, however, experiments have shown that it is not possible to eliminate air bubbles by evacuation of highly viscous honey at low temperatures.

It is therefore an object of the present invention to overcome the above discussed difficulties.

It is a further object of the present invention to provide a method and an apparatus for treating honey so as to obtain a clear, molten pure honey product which is free of extraneous matter.

It is yet another object of the present invention to provide a method and apparatus for treating commercial honey or materials having similar characteristics so as to obtain in a simple and economical manner a clear pure product which is flowable and free from extraneous matters and air bubbles.

Other objects and advantages of the present invention will become apparent from a further reading of the description and of the appended claims.

With the above and other objects in view, the present invention contemplates a method of treating honey, comprising the steps of mixing a major portion of honey to be treated and a minor portion of the distillate obtained by vacuum distillation of honey, at a temperature and for a period of time sufficient to form thereof a substantially clear melt consisting of the honey and the distillate, and subjecting the thus-formed melt to vacuum distillation in such a manner as to remove therefrom distillate in an amount corresponding to the minor portion of distillate, whereby a clear molten honey and a distillate adapted for use in the treatment of honey are obtained.

According to a preferred manner of carrying out the method of the present invention, the same comprises the steps of subjecting honey to vacuum distillation at a temperature below 56° C. so as to separate a distillate therefrom, mixing under stirring a major portion of honey to be treated and a predetermined portion of the thus obtained distillate at a temperature of up to about 46° C. and for a period of time sufficient to form of the honey to be treated and the distillate a substantially clear melt, the predetermined portion of distillate being so chosen as to obtain in the melt a water content of between 18% and 25%, and subjecting the thus formed melt to vacuum distillation at a residual pressure not exceeding 120 mm. Hg in such a manner as to separate from the melt distillate in an amount corresponding to the predetermined portion of distillate, whereby a clear molten honey having a water content substantially equal to that of the honey to be treated, and a distillate adapted for use in the treatment of subsequent portions of honey are obtained.

In addition, it is preferred to screen the molten honey prior to subjecting the same to vacuum distillation.

The present invention is also concerned with an arrangement for treating honey and the like which comprises, in combination, treating means for mixing under stirring and heating honey to be treated and liquid honey constituents including water so as to form thereof a molten honey of increased water content, vacuum distillation means including condenser means for subjecting molten honey to vacuum distillation so as to remove liquid constituents including water therefrom and to reduce the water content of the molten honey to substantially that of the honey to be treated; first conduit means communicating with the treating means and the vacuum distillation means for passing molten honey from the treating means to the vacuum distillation means, and second conduit means for passing distillate from the vacuum distillation means to the treating means.

According to a preferred embodiment, the arrangement for treating honey and the like comprises, treating means for mixing under stirring and heating honey to be treated and liquid honey constituents including water so as to form thereof a molten honey of increased water content, vacuum distillation means including condenser means for continuously subjecting thin layers of molten honey to vacuum distillation so as to remove liquid constituents including water therefrom and to reduce the water content of the molten honey to substantially that of the honey to be treated, first conduit means including screening and heat insulated storage means communicating with the treating means and the vacuum distillation means for passing molten honey from the treating means to the vacuum distillation means, and second conduit means including deaerating means for passing distillate from the vacuum distillation means to the treating means.

The present invention is based on the recognition that the melting of honey could be greatly improved, i.e., could be carried out at lower temperatures and within a shorter period of time, if the water content of the honey which is to be thus treated could be increased. However, even the temporary addition of extraneous water to honey is not permissible in many countries.

The present invention solves this problem by carrying out the melting, purifying and/or deaerating of honey by adding thereto an aqueous distillate obtained by vacuum distillation of previously treated honey, or initially of untreated honey, and stirring the mixture, which due to the addition of this distillate has a higher water content, at a relatively low temperature which will not cause any damage to the honey. Stirring is continued for several hours, until the honey is completely molten. It is possible in this manner, at a relatively low temperature and in a relatively short period of time such as for instance between 2 and 6 hours to achieve complete melting of the honey so that a homogeneous fluid is formed in which, however, solid impurities which are not honey constituents may still be dispersed. The thus formed fluid honey of increased liquid content is then separated from these impurities, preferably by passing the fluid honey through a fine mesh screen, and thereafter the screened molten honey is subjected to vacuum distillation until an amount of distillate has been removed therefrom which is substantially equal to the amount of distillate which had been initially added to the honey, so that the distilled honey will have a water content which is substantially equal to that of the honey prior to treatment of the same.

It is possible according to the present invention to convert the original honey without the addition of water from an extraneous source, i.e. without the addition of water which is not derived from honey, into a liquid which is highly fluid at a relatively low temperature, so that the thus molten or liquefied honey can be easily passed through a fine mesh screen and thereby separated from solid impurities.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the figure is a schematic elevational view, partially in cross section of an arrangement for carrying out the method of the present invention.

Referring now to the drawing, it will be seen that melting of the honey is carried out in treating vessel 1 which is provided with jacket 2 for heating the contents of vessel 1 by passing hot water through jacket 2. A stirrer 3 is arranged inside vessel 1.

Distillate withdrawn by vacuum distillation from a preceding batch of honey is introduced into treating vessel 1 through conduit 4. The introduction of distillate may be carried out intermittently.

It has been found advantageous to maintain the honey and distillate in treating vessel 1 at a temperature which should not exceed about 46° C., in order to avoid any possible impairment of the quality of the finished product which might be caused by excessive temperatures. The period of time required at a temperature of 46° C. or somewhat below for dissolving all of the relatively more difficult to dissolve constituents of the honey depends on the water content of the honey. Thus, if the water content of the honey is about 16% by weight or less, it is hardly possible to achieve complete dissolution of all honey constituents without damage to the honey due to exposure to excessive temperatures or due to treatment for an excessive length of time. However, if the water content of the honey is increased by between about 2 and 5%, i.e. to a total water content of between about 18 and 23%, which increase in water content may be achieved by the addition of the above mentioned distillate, then it will be found that these difficultly soluble constituents of the honey will be dissolved within a few hours without any damage to, or impairment of the quality of the honey.

As soon as all constituents of the honey and the distillate added thereto in treating vessel 1 have been converted into a homogeneous fluid of relatively low viscosity, the entire content of the treating vessel 1 is passed through screen 5 into a storage container 6.

Withdrawal of the honey melt from vessel 1 may be carried out, discontinuously. By passing the molten honey through screen 5, dirt particles and any other extraneous solid impurities will be removed so that only clear homogeneous and highly fluid honey will enter storage vessel 6. Storage vessel 6 preferably will be provided with a suitable conventional heating device, such as a jacket, in order to maintain the honey in highly fluid condition and to reduce the amount of heat required during subsequent vacuum distillation of the honey. It is also possible to provide storage vessel 6 with suitably insulated walls in order to prevent loss of heat, rather than with heating means which would convey additional heat to the honey in the storage vessel.

From storage vessel 6, the honey flows, preferably continuously, through conduit 7 into vacuum evaporator 8. If necessary, a pump (not shown) may be arranged in conduit 7.

The type of vacuum evaporator which has been found best suitable for the removal of the relatively small fraction of distillate from the liquid honey is a thin layer evaporator, i.e. an evaporator in which a thin flow of honey is subjected to evaporation. In other words, preferably, the honey will be subjected to vacuum evaporation while being distributed so as to have per unit of volume a relatively large surface area. The evaporator in which thin layers of honey are partially evaporated under a suitable partial vacuum is preferably heated with hot water as indicated by water inlet 9 and water outlet 10. In evaporator 8, an amount of distillate is distilled off the honey which equals the amount of distillate which has been added to the honey in treating vessel 1, so that the honey leaving evaporator 8 will be of the same concentration as the honey initially introduced into treating vessel 1. The honey which thus has been restored to its initial concentration is then pumped by pump 11 to storage vessel 12.

It is generally satisfactory to withdraw between 2 and 5% distillate from the honey during evaporation of the same, i.e. the same percentage as has been added to the honey in treating vessel 1.

The vapors withdrawn from the honey in evaporator 8 pass through water-cooled condenser 13 and are liquified therein. The cooling water is introduced into condenser 13 through conduit 16 and withdrawn therefrom through conduit 17. The liquefied vapors and air which has passed together with the vapors from evaporator 8 to condenser 13 are then passed through vacuum pump 14 and the air-liquid mixture is introducted into deaerator 15 from which air escapes through conduit 18, while the distilled and again condensed honey vapors are returned through conduit 4 into treating vessel 1 for diluting therein subsequent portions of honey to be treated.

In the vacuum evaporator, particularly in one of the type described, namely an evaporator wherein relatively thin layers of honey are subjected to partial evaporation, evaporation preferably is carried at a residual pressure of about 40 mm. Hg corresponding to a boiling temperature of about 45° C. In any event, the boiling temperature in the evaporator should be sufficiently low, preferably below 46° C., so that any damage to the honey due to exposure to excessively high temperatures is avoided.

The distillate which is withdrawn from honey in evaporator 8 and collected in deaerator 15 consists mainly of water. However, it also contains valuable aromatic substances which, in view of the flow of the distillate in a closed circle will not get lost but will be reintroduced into a subsequent portion of honey in treating vessel 1. According to the present invention the entire distillate is thus returned to the subsequent portion of honey.

The present invention thus does not only permit temporary dilution of honey during processing without the addition of water from an extraneous source, but in addition, will preserve all of the aromatic constituents which would be lost if after distillation the condensed distillate would not be completely returned to subsequent portions of honey to be treated.

The present invention provides further advantages which could not be achieved by introduction of extraneous water, namely that due to recycling of the entire distillate a loss of flavoring or aromatic substances is prevented and, furthermore, the heat economy of the process is improved over that of a process wherein extraneous water would be introduced into treating vessel 1 and upon withdrawing of the extraneous water by distillation in evaporator 8, the thus formed distillate would be discarded, or in any event not returned to subsequent portions of honey to be treated.

The air bubbles which are retained by the honey will be separated from the liquid portion of the honey while the same is subjected to evaporation in evaporator 8 and the air of these bubbles will pass together with the distillate through condenser 13 and into deaerator 15 from where the air will escape through outlet or conduit 18.

Thereby the further advantage will be achieved that the honey will be substantially completely deaerated and this will improve the clarity of the final product.

It is advantageous, upon starting the above described operation, to first introduce into evaporator 8 honey of relatively high water content in order to produce sufficient distillate for the treatment of subsequent portions of honey. If the water content of the initial portion of honey which is introduced into evaporator 8 is relatively high, then only relatively small amounts of such initial honey will be required in order to produce the amount of distillate necessary for treatment of the subsequent portion of honey which is introduced into treating vessel 1. Thereafter, the withdrawal of distillate in evaporator 8 and the introduction of condensed distillate into treating vessel 1 will be evenly proportioned so that a continuous circular flow is achieved. It is of course also possible to store, for instance, the last portion of condensed distillate which is obtained just prior to closing down the operation and to use this stored portion of distillate for again starting the operation, without requiring at the start of the operation the distillation of a portion of honey for producing the initially required amount of distillate.

After sufficient distillate for introduction in treating vessel 1 has either been produced by the distillation of an initial honey portion or if a sufficient amount of distillate has been stored from previous operations to serve for this purpose, it is then again possible to charge treating vessel 1 with honey of relatively low water content and adjust the water content of the honey in treating vessel 1 to the desired percentage of preferably between 18 and 25% by addition of the required amount of distillate. In a continuous operation of the illustrated device in the manner described herein, the water content of the treated honey will always remain the same as the water content of the crude honey which is charged into treating vessel 1, since the amount of distilled and again condensed liquid will pass in a closed circuit throughout the apparatus without any withdrawal of water or introduction of water other than in the form of honey.

The method of the present invention has considerable advantages not only for the treating of honey containing a relatively low percentage of water but also for the treatment of honey of larger water content. Although the melting of honey of larger water content could be carried out at a satisfactorily low temperature, the substantially complete deaeration of the same which is achieved by passage through the evaporator 8 constitutes a very significant advantage of the present process and will permit a considerable shortening of the melting step in treating vessel 1, since this melting step will have to be carried out only for the purpose of melting the honey and need not be prolonged until a certain degree of deaeration is achieved thereby.

Thus, the method of the present invention and the apparatus thereof may be used either for the melting or the deaeration of honey or, in most cases, for melting as well as deaeration of the honey which is to be treated.

The present invention as described above is not only limited to the treatment of honey but it is also possible to carry out somewhat similar melting, dissolving and deaerating processes with respect to other materials which possess physical characteristics which are somewhat similar to that of honey.

*Example of proceeding*

1000 kgs. of viscous honey with a water content of 17% by weight are fed into the treating vessel 1. From the deaerator 15, 64 kgs. of distillate withdrawn by vacuum distillation from a preceding batch of honey is introduced in vessel 1. Thereby the water content of the honey in the treating vessel 1 increases to 22%. The treating vessel 1 is heated by passing hot water of 45° C. through the heating jacket 2. The water is heated electrically or by heating steam and the temperature is controlled by an automatic controller.

The treating vessel has a stirrer 3 by which the honey is stirred until all of the relatively more difficult to dissolve constituents in the honey have dissolved, i.e. in a sample of honey no soluble honey particles may be found under a microscope. The required time of stirring is 2–3 hours.

After stirring the molten honey flows from treating vessel 1 over the filter 5 which consists of three screens into the storage tank 6. The different screens have 100, 400 and 900 meshes per cm.$^2$.

The thin layer evaporator 8 and the condenser 13 are under a vacuum of 40 mm. Hg. By the vacuum the honey is sucked out of the storage tank 6 through the conduit 7 into the evaporator 8. The feed is controlled by hand with a valve in the conduit 7. In the evaporator the distillate which was added to the honey is distilled and at the same time the air bubbles distributed in the honey are withdrawn.

The dosage of the feed of honey must be effected in a way that just the same quantity of honey distillate is evaporated as was added to the honey in the treating vessel 1.

In the main the evaporator consists of a double walled tube outside heated by water at 70° C. The honey enters in the head of evaporator and as a result of the force of gravity flows downwards and is dispersed on the inner surface of the evaporator as a thin film by a rotor with many blades. Pump 11 drains off the refined honey of the evaporator. This pump pumps the honey into the storage tank 12. The honey distillate is condensed in the water-cooled condenser 13 and is sucked off by the vacuum pump 14 together with the air driven out of the honey. The distillate is gathered in a deaerator 15 for the following charge of honey. The sucked off air goes out through pipe 18 to the open-air. The condenser requires about 5 m.$^3$/h. of cooling water with a temperature of max. 18° C.

It will be understood that each of the elements described above, or two or more together, may also find a useful application in other types of melting, dissolving and deaerating devices differing from the types described above.

While the invention has been illustrated and described as embodied in a method and device for the treatment of honey, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and,

What is claimed as new and desired to be secured by Letters Patent is:

1. A method of producing a molten honey which is substantially clear and free of solid constituents, comprising the steps of mixing a major portion of honey to be treated and a minor portion of distillate of honey, at a temperature and for a period of time sufficient to form thereof a substantially clear melt consisting of said honey and said distillate, said minor portion of distillate being so chosen as to form of said distillate and said honey to be treated a mixture having a water content in excess of 16%; and subjecting the thus-formed melt to vacuum distillation at a residual pressure sufficiently low and for a period of time sufficiently long to remove from the thus formed melt distillate in an amount corresponding to said minor portion of distillate, whereby separately clear molten honey and distillate are obtained.

2. A method of producing a molten honey which is substantially clear and free of solid constituents, comprising the steps of subjecting honey to vacuum distillation so as to separate a distillate therefrom; mixing a major portion of honey to be treated and a minor portion of said distillate of honey at a temperature and for a period of time sufficient to form thereof a substantially clear melt consisting of said honey and said distillate, said minor portion of distillate being so chosen as to form of said distillate and said honey to be treated a mixture having a water content in excess of 16%; subjecting the thus-formed melt to vacuum distillation at a residual pressure not exceeding about 120 mm. Hg for a period of time sufficient to remove therefrom distillate in an amount corresponding to said minor portion of distillate, whereby separately clear molten honey and distillate are obtained; and adding at least a portion of the thus obtained distillate to other honey prior to vacuum distillation of the same.

3. A method of producing a molten honey which is substantially clear and free of solid constituents, comprising the steps of mixing a major portion of honey to be treated and a minor portion of distillate of honey at a temperature of up to about 46° C.–56° C. and for a period of time sufficient to form thereof a substantially clear melt consisting of said honey and said distillate, said minor portion of distillate being so chosen as to form of said distillate and said honey to be treated a mixture having a water content in excess of 16%; subjecting the thus-formed melt to vacuum distillation at a residual pressure not exceeding about 120 mm. Hg for a period of time sufficient to remove therefrom distillate in an amount corresponding to said minor portion of distillate, whereby separately clear molten honey and distillate are obtained; and adding at least a portion of the thus obtained distillate to other honey prior to vacuum distillation of the same.

4. A method of producing a molten honey which is substantially clear and free of solid constituents, comprising the steps of mixing a major portion of honey to be treated and a minor portion of distillate of honey at a temperature and for a period of time sufficient to form thereof a substantially clear melt consisting of said honey and said distillate, said minor portion of distillate being so chosen as to form of said distillate and said honey to be treated a mixture having a water content in excess of 16%; subjecting the thus-formed melt to vacuum distillation at a residual pressure such that said melt will boil at a temperature below about 56° C. for a period of time sufficient to remove therefrom distillate in an amount corresponding to said minor portion of distillate, whereby separately clear molten honey and distillate are obtained; and adding at least a portion of the thus obtained distillate to other honey prior to vacuum distillation of the same.

5. A method of producing a molten honey which is substantially clear and free of solid constitutents, comprising the steps of mixing a major portion of honey to be treated and a minor portion of distillate of honey at a temperature and for a period of time sufficient to form thereof a substantially clear melt consisting of said honey and said distillate, said minor portion of distillate being so chosen as to form of said distillate and said honey to be treated a mixture having a water content in excess of 16%; subjecting the thus-formed melt to vacuum distillation at a residual pressure such that said melt will boil at a temperature of about 46° C.–56° C. for a period of time sufficient to remove therefrom distillate in an amount corresponding to said minor portion of distillate, whereby separately clear molten honey and distillate are obtained; and adding at least a portion of the thus obtained distillate to other honey prior to vacuum distillation of the same.

6. A method of producing a molten honey which is substantially clear and free of solid constituents, comprising the steps of mixing a major portion of honey to be treated and a predetermined portion of distillate of honey at a temperature and for a period of time sufficient to form thereof a substantially clear melt consisting of said honey and said distillate, said predetermined portion of distillate being so chosen as to form of said distillate and said honey to be treated a mixture having a water content in excess of 16%; subjecting the thus-formed melt to vacuum distillation at a residual pressure not exceeding about 120 mm. Hg for a period of time sufficient to remove therefrom distillate in an amount corresponding to said predetermined portion of distillate, whereby a clear molten honey and a distillate adapted for use in the treatment of subsequent portions of honey are obtained; and adding at least a portion of the thus obtained distillate to other honey prior to vacuum distillation of the same.

7. A method of producing a molten honey which is substantially clear and free of solid constituents, comprising the steps of mixing a major portion of honey to be treated and a predetermined portion of distillate of honey at a temperature and for a period of time sufficient to form thereof a substantially clear melt consisting of said honey and said distillate, said predetermined portion of distillate being so chosen as to form of said distillate and said honey to be treated a mixture having a water content of between about 18 and 25%; subjecting the thus-formed melt to vacuum distillation at a residual pressure not exceeding about 120 mm. Hg for a period of time sufficient to remove therefrom distillate in an amount corresponding to said predetermined portion of distillate, whereby separately clear molten honey and distillate are obtained; and adding at least a portion of the thus obtained distillate to other honey prior to vacuum distillation of the same.

8. A method of producing a molten honey which is substantially clear and free of solid constituents, comprising the steps of mixing a major portion of honey to be treated and a minor portion of distillate of honey, at a temperature and for a period of time sufficient to form thereof a substantially clear melt consisting of said honey and said distillate, said minor portion of distillate being so chosen as to form of said distillate and said honey to be treated a mixture having a water content in excess of 16%; subjecting the thus-formed melt to vacuum distillation at a residual pressure of about 40 mm. Hg for a period of time sufficient to remove therefrom distillate in an amount corresponding to said minor portion of distillate, whereby separately clear molten honey and distillate are obtained; and adding at least a portion of the thus obtained distillate to other honey prior to vacuum distillation of the same.

9. A method of producing a molten honey which is substantially clear and free of solid constituents, comprising the steps of subjecting honey to vacuum distillation at a temperature below 56° C. so as to separate a distillate therefrom; mixing under stirring a major portion of honey to be treated and a predetermined portion of the thus obtained distillate at a temperature of up to about 46° C. and for a period of time sufficient to form of said honey to be treated and said distillate a substantially clear melt, said predetermined portion of distillate being so chosen as to obtain in said melt a water content of between 16% and 25%; subjecting the thus formed melt to vacuum distillation at a residual pressure not exceeding 120 mm. Hg for a period of time sufficient to separate from said melt distillate in an amount corresponding to said predetermined portion of distillate, whereby separately a clear molten honey having a water content substantially equal to that of said honey to be treated, and a distillate are obtained; and adding at least a portion of the thus obtained distillate to other honey prior to vacuum distillation of the same.

10. A method of producing a molten honey which is substantially clear and free of solid constituents, comprising the steps of mixing a major portion of honey to be treated and a minor portion of distillate of honey, at a temperature and for a period of time sufficient to form thereof a melt consisting of said honey and said distillate, said minor portion of distillate being so chosen as to form of said distillate and said honey to be treated a mixture having a water content in excess of 16%; passing said melt through a screen so as to remove solid impurities therefrom; and subjecting the thus-screened melt to vacuum distillation at a residual pressure not exceeding about 120 mm. Hg for a period of time sufficient to remove therefrom distillate in an amount corresponding to said minor portion of distillate, whereby separately clear molten honey and distillate are obtained; and adding at least a portion of the thus obtained distillate to other honey prior to vacuum distillation of the same.

References Cited by the Examiner
UNITED STATES PATENTS

| | | | |
|---|---|---|---|
| 1,636,719 | 7/1927 | Somerford | 99—146 |
| 2,525,025 | 10/1950 | Feil | 202—205 |
| 2,624,678 | 1/1953 | Hageman | 99—146 |
| 2,690,972 | 10/1954 | Bradshaw | 99—146 |
| 2,818,373 | 12/1957 | Ockrent | 202—205 |
| 2,906,630 | 9/1959 | Turkot et al. | 99—146 X |

FOREIGN PATENTS

| | | |
|---|---|---|
| 101,168 | 6/1937 | Australia. |

OTHER REFERENCES

Food Industries, January 1935, pages 18 and 19, "New Method of Filtering Honey."

A. LOUIS MONACELL, *Primary Examiner.*

RAYMOND N. JONES, *Examiner.*

S. E. HEYMAN, *Assistant Examiner.*